United States Patent [19]

Guyon et al.

[11] Patent Number: 5,105,468

[45] Date of Patent: Apr. 14, 1992

[54] TIME DELAY NEURAL NETWORK FOR PRINTED AND CURSIVE HANDWRITTEN CHARACTER RECOGNITION

[75] Inventors: Isabelle Guyon, Locust; John S. Denker, Leonardo, both of N.J.; Yann LeCun, Bonnelle, France

[73] Assignee: AT&T Bell Laboratories, Murray Hill, N.J.

[21] Appl. No.: 679,988

[22] Filed: Apr. 3, 1991

[51] Int. Cl.⁵ ............................................. G06K 9/62
[52] U.S. Cl. ........................................ 382/14; 382/15
[58] Field of Search ............................. 382/10, 14–15, 382/37–39, 13

[56] References Cited

U.S. PATENT DOCUMENTS

| | | | |
|---|---|---|---|
| 4,317,109 | 2/1982 | Odaka et al. | 340/146.3 AC |
| 4,653,107 | 3/1987 | Shojima et al. | 382/13 |
| 4,809,193 | 2/1989 | Jourjine | 382/15 |
| 4,876,731 | 10/1989 | Loris et al. | 382/15 |
| 4,937,872 | 6/1990 | Hopfield et al. | 382/10 |
| 4,941,122 | 7/1990 | Weideman | 382/15 |
| 4,965,725 | 10/1990 | Rutenberg | 382/15 |
| 5,005,206 | 4/1991 | Naillon et al. | 382/15 |
| 5,040,230 | 8/1991 | Takatori et al. | 382/14 |
| 5,048,100 | 9/1991 | Kuperstein | 382/15 |

OTHER PUBLICATIONS

Odaka, K. et al., "Online Recognition of Handwritten Characters . . . ", The Transactions of the IECE of Japan, vol. E63, No. 2, Feb. 1980, pp. 168–169.
Tappert, C. C. et al., "The State of the Art in On-Line Handwriting Recognition", IEEE Trans. on Pattern Analysis and Machine Intelligence, vol. 12, No. 8, Aug. 1990, pp. 787–808.
Guyon, I et al., "A Time Delay Neural Network . . . ", International Neural Network Conference, vol. I, Paris, France, Jul. 9–13, 1990, pp. 42–45.
Waibel, A. et al., "Phoneme Recognition Using Time-Delay Neural Networks", IEEE Trans. on Acoustics, Speech and Signal Processing, vol. 37, No. 3, Mar. 1989, pp. 328–339.

Primary Examiner—Stephen Brinich
Attorney, Agent, or Firm—Gregory C. Ranieri

[57] ABSTRACT

A time delay neural network is defined having feature detection layers which are constrained for extracting features and subsampling a sequence of feature vectors input to the particular feature detection layer. Output from the network for both digit and uppercase letters is provided by an output classification layer which is fully connected to the final feature detection layer. Each feature vector relates to coordinate information about the original character preserved in a temporal order together with additional information related to the original character at the particular coordinate point. Such additional information may include local geometric information, local pen information, and phantom stroke coordinate information relating to connecting segments between the end point of one stroke and the beginning point of another stroke.

The network is also defined to increase the number of feature elements in each feature vector from one feature detection layer to the next. That is, as the network is reducing its dependence on temporally related features, it is increasing its dependence on more features and more complex features.

7 Claims, 7 Drawing Sheets

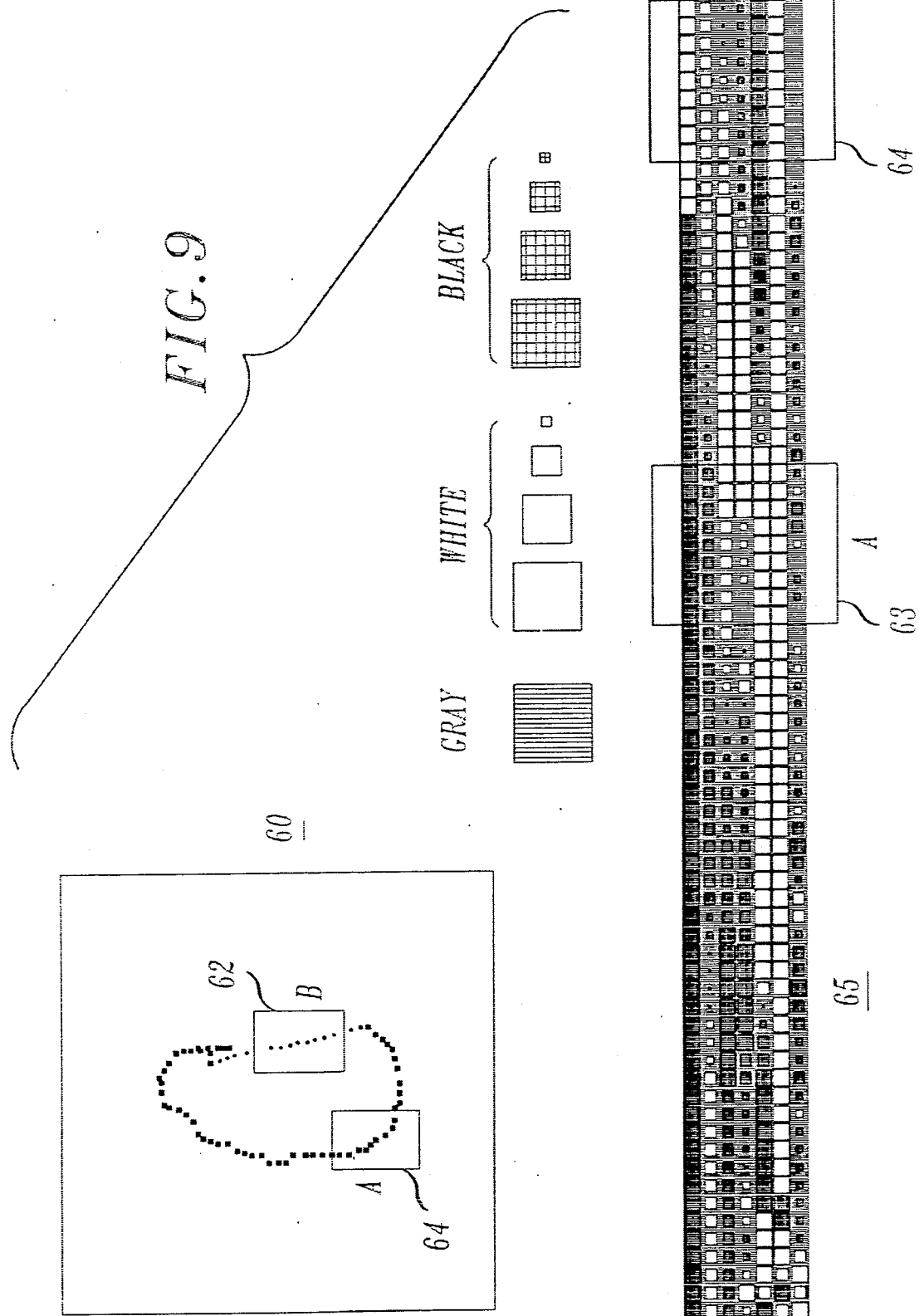

TIME DELAY NEURAL NETWORK FOR PRINTED AND CURSIVE HANDWRITTEN CHARACTER RECOGNITION

TECHNICAL FIELD

This invention relates to pattern recognition and, more particularly, to computation networks for handwritten character or symbol recognition including on-line, real-time recognition.

BACKGROUND OF THE INVENTION

Character recognition has been applied to cursive script and printed characters which are written on a tablet, electronic or otherwise, and transformed into an image for input to a neural network. Such an image may be a static ("off-line") image of the character or it may be a dynamic ("on-line") image of the character. The former is a set of x and y coordinates with associated brightness levels whereas the latter is a temporal ordering of the x and y coordinate information together with any additional dynamic stroke information such as pen pressure and the like.

Neural networks have been designed to recognize either type of image for a character with varying degrees of success. They are sensitive to changes in appearance of a character presented for classification. These networks prefer that the characters adhere to some degree of consistency from one writer to the next. Placement of the character within a writing area, size of the character, and attitude of the character as well as other handwritten character attributes all contribute to the network's ability to correctly classify the character.

Several systems dealing with recognition of on-line handwritten characters are described in U.S. Pat. Nos. 4,317,109 and 4,653,107. These systems depend on segmentation of the character into a plurality of stroke segments which are then compared with a reference stroke for likeness and relative position in the order of stroke segments. Essentially, these techniques involve template matching with an additional factor relating to the sequential ordering of the segments. Such approaches may tend to be applicable to Chinese and Japanese characters but they suffer from an inability to correctly recognize other cursive and handprinted characters when executed by different writers.

Other systems proposed in the literature depend heavily on such factors as: limiting the number of recognizable classes of characters to digits only, uppercase or lowercase letters only, or symbols only; restricting character formation to be either isolated characters or continuous character groups; and using syntactic, semantic or context information to aid in the classification and recognition processes.

SUMMARY OF THE INVENTION

Writer independence and broad recognizability of classes of characters are achieved without the use of context information in a time delay neural network having feature detection layers which are constrained for extracting features and subsampling a sequence of feature vectors (frames) input to the particular feature detection layer. Output from the network for both digit and uppercase letters is provided by an output classification layer which is fully connected to the final feature detection layer. Each feature vector or frame relates to coordinate information about the original character preserved in a temporal order together with additional information related to the original character at the particular coordinate point. Such additional information may include local geometric information, local pen information, and phantom stroke coordinate information relating to connecting segments between the end point of one stroke and the beginning point of another stroke.

The network is also defined to increase the number of feature elements in each feature vector from one feature detection layer to the next. That is, as the network is reducing its dependence on temporally related features, it is increasing its dependence on more features and more complex features.

In order to improve the classification process by the network, extraction of information about the relative position of first and last points for the character trajectory is afforded by including a phantom stroke called a cyclic closure stroke in the feature vector sequence between the last coordinate point of the character and the first coordinate point of the character. Data points are interpolated in a predetermined manner by making the coordinate data cyclic to artificially close an open character where the initial and final points for the character are different. This technique improves the operation of the network when trying to distinguish a "6" from a "0".

BRIEF DESCRIPTION OF THE DRAWING

A more complete understanding of the invention may be obtained by reading the following description of a specific illustrative embodiment of the invention in conjunction with the appended drawing in which:

FIG. 9 shows a comparison between the resampled handwritten character and its intermediate representation as formed in the preprocessor.

DETAILED DESCRIPTION

Figure 1:
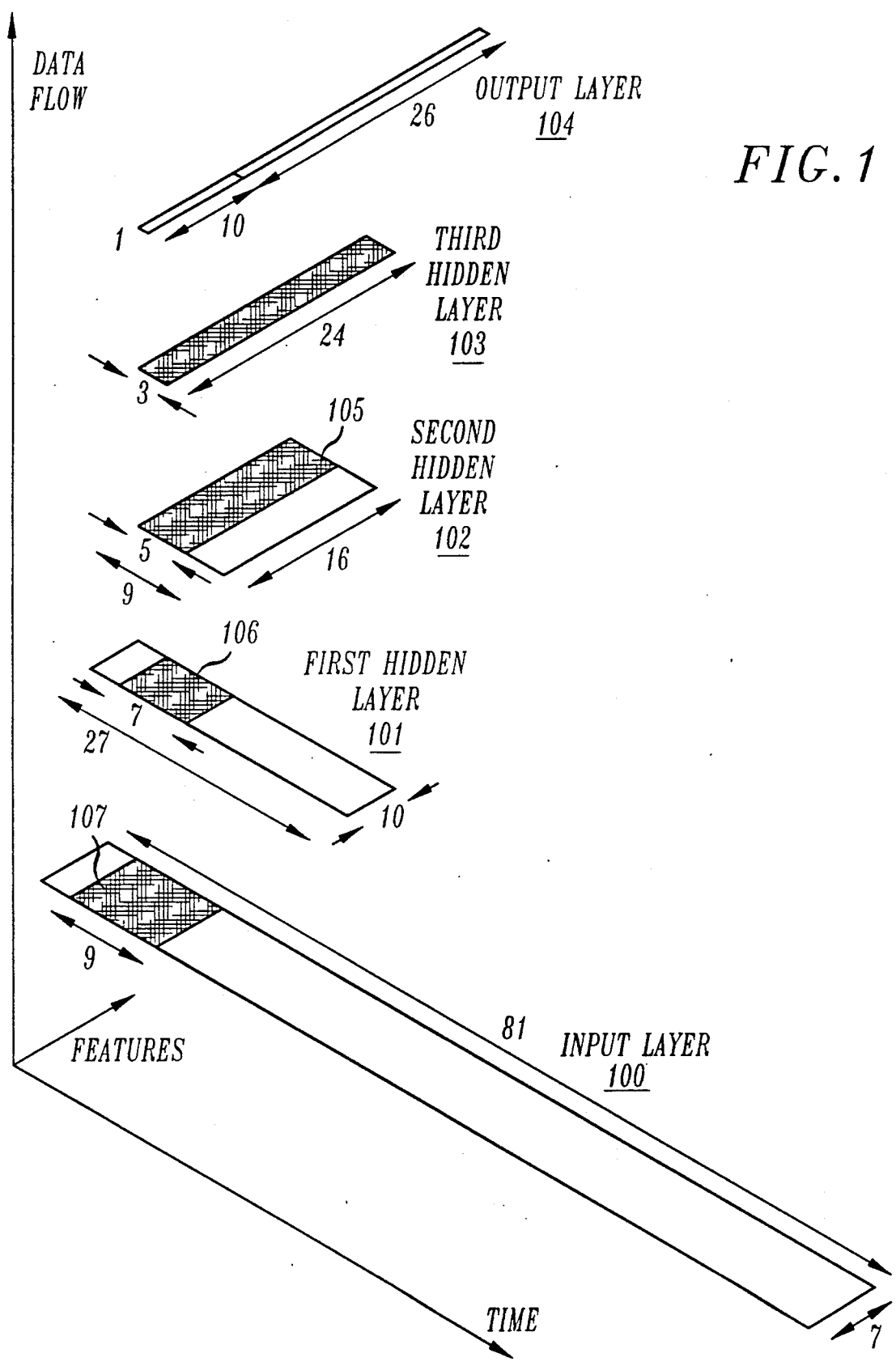
FIGS. 1 and 2 show simplified diagrams of the layers in the time delay neural network in accordance with the principles of the present invention.

An exemplary network for on-line recognition of handwritten characters including digits and uppercase letters is described below. Characters are entered on a touch terminal consisting of a transparent touch-sensitive screen overlayed on a liquid-crystal display. Drawing actions are recorded as a sequence of coordinates [x(t), y(t)]. This allows the use of a representation for the character which preserves the sequential nature of the data, in contrast with other approaches based on pixel-map representation. Trajectories, representing single characters, are resampled with a fixed number of regularly spaced points. Coordinates preprocessing extracts local geometric information such as the direction of the movement, and the curvature of the trajectory. The final output of the preprocessor is a sequence of 81 vectors with 7 feature elements each. This sequence is then processed by a novel Time Delay Neural Network.

The present time delay neural network is a multilayer feed-forward network, the layers of which perform subsampling of the prior layer with successively higher level feature extraction and final classification. A different time delay neural network used for speech recognition was proposed by Waibel et al., *IEEE Trans. Acoustics, Speech*, and *Signal Processing*, Vol. 37, No. 3, pp. 328-39 (1989).

The network was trained to recognize either digits or capital letters with a modified version of the back-propagation algorithm. The training set contained 12,000 examples produced by a large number of different writers. The error rate was 3.4% on 2,500 text examples from a disjoint set of writers. When allowed to reject 7.2%, the system made 0.7% substitution errors. The recognizer was implemented on an AT&T 6386 PC with an auxiliary AT&T touch terminal. The throughput of the system, including acquisition, preprocessing and display, was 1.5 characters per second. Preprocessing is only responsible for 2% of this time.

This implementation of the time delay neural network is sequential. It is contemplated that speed can be improved by parallelization and/or pipelining. Ideally, the recognized answer would be available as soon as the last input is presented. But the latency of the present time delay neural network is relatively insignificant, since the all-important preprocessing (not the time delay neural network) required the whole sequence to be known, in order to compute the length of the trajectory for the resampling.

Figure 2:
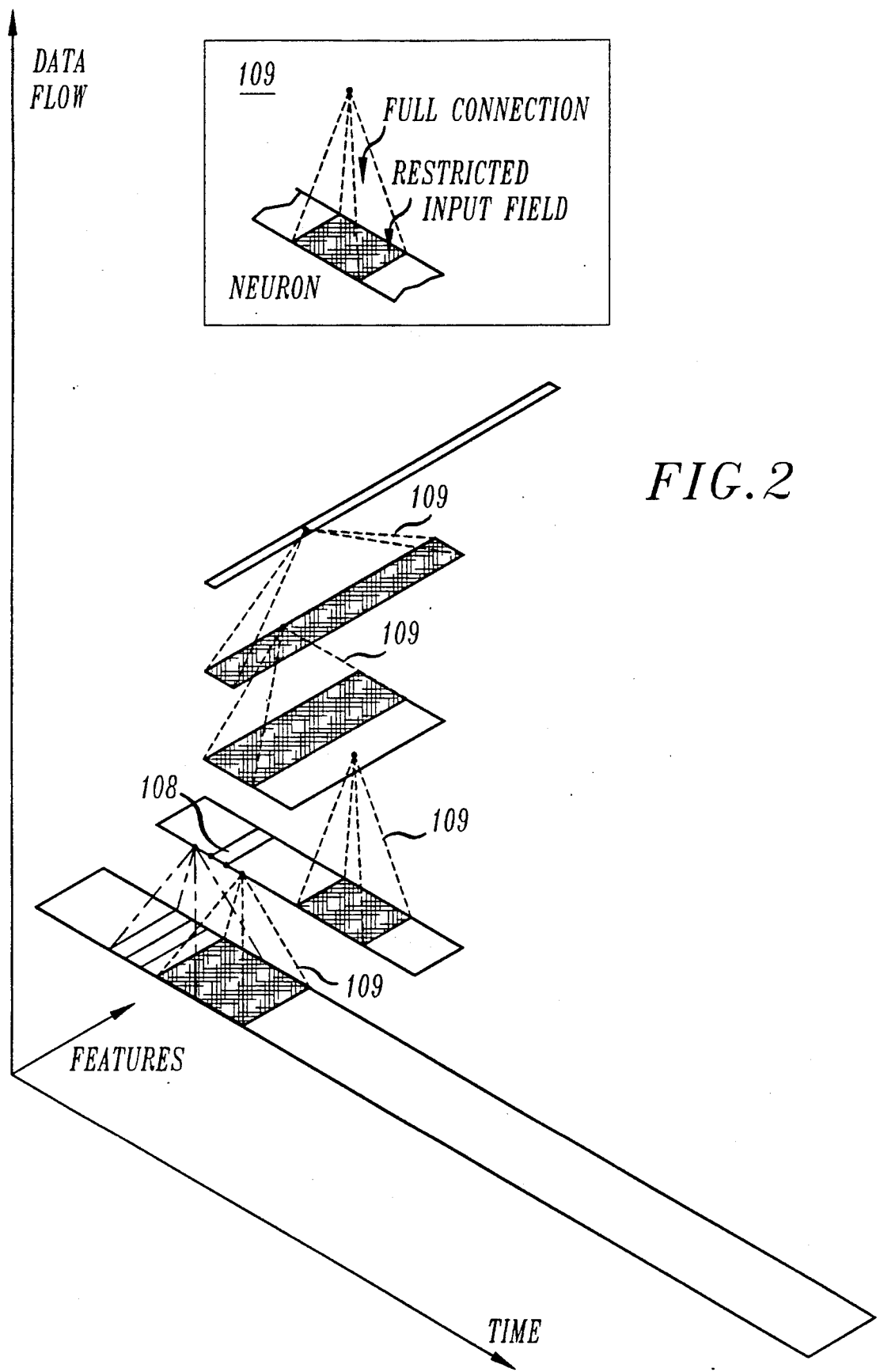
Figure 3:
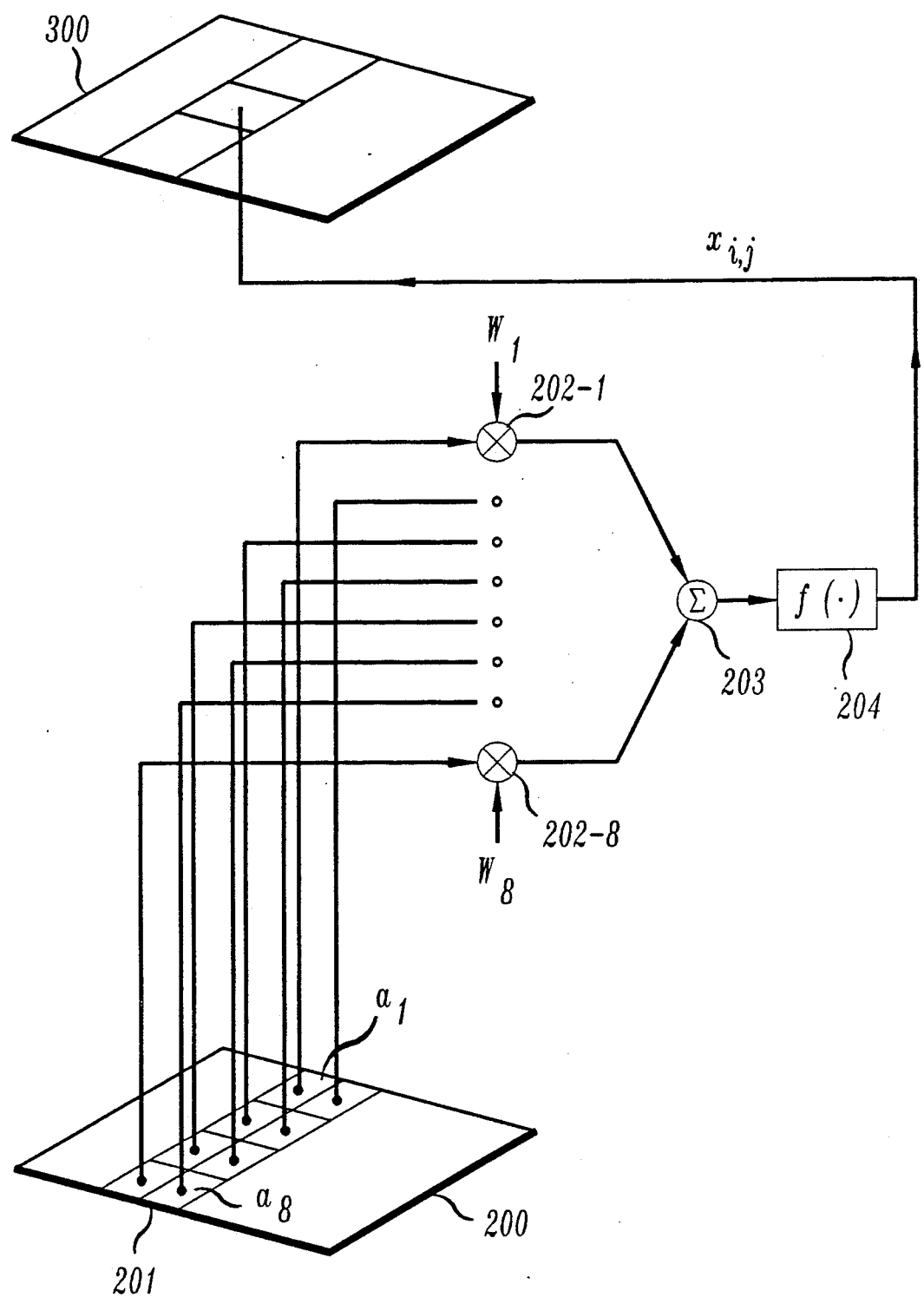
FIG. 3 shows a representation of an unfolded time delay neuron for use in the time delay neural network of FIG. 1.
Figure 4:
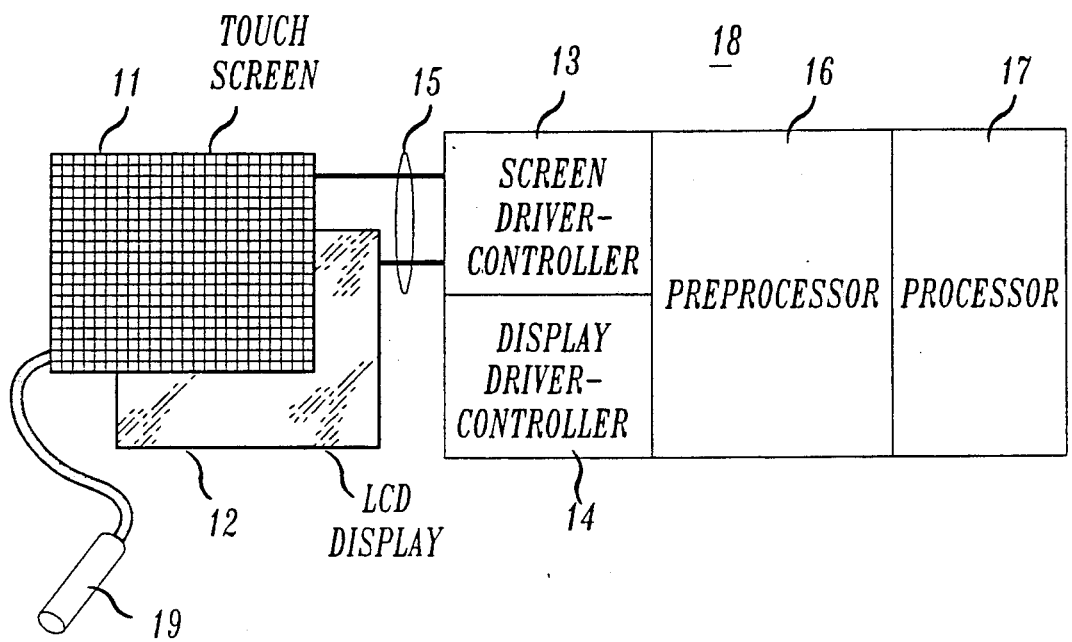
FIG. 4 shows a simplified diagram of the touch terminal and processor for realizing the combined preprocessor and time delay neural network accordance with the principles of the invention.

The description which follows is divided into two sections: one section devoted to the time delay neural network architecture and related FIGS. 1 through 3 and a second section devoted to preprocessing to form the intermediate representation as a feature vector or frame sequence as shown from FIG. 4 to FIG. 9.

NETWORK ARCHITECTURE

The architecture of the network is classified as a Time Delay Neural Network. This network is a multilayer feed-forward network, the layers of which perform successively higher-level feature extraction and the final classification. The intermediate representation produced by the preprocessor (FIG. 9) captures local topological features along the curve of the character. It is then used as the input to a neural network (FIGS. 1-3) which is trained to make use of these simple local features and extract more complex, more global features.

Computational elements or neurons as shown in FIG. 3 form the fundamental functional and interconnectionist blocks between layers for the time delay neural network realized in accordance with the principles of the invention. In general, a neuron forms a weighted sum of input values for $n+1$ inputs (e.g., $n=8$ in FIG. 3) and passes the result through a nonlinearity to arrive at a single value. The input and output values for the neuron may be analog, quasi-analog such as multi-level and gray scale, or binary in nature. Nonlinearities commonly employed in neurons include hard limiters, threshold logic elements, and sigmoid nonlinearities, for example. The neuron depicted in FIG. 3 is a so-called unfolded time delay neuron. It is equivalent to a neuron having inputs from a single frame or feature vector, which inputs are then fanned out in parallel paths to delays varying from a zero unit delay to an $(K-1)$ unit delay where K frames or faeture vectors are in the receptive field of a neuron. Such a neuron is a folded time delay neuraon and is depicted in FIG. 1 of the above identified Waibel et al. article which is expressly incorporated herein by reference.

In operation, the neuron shown in FIG. 3 scans n neighboring input elements 201 from a frame sequence 200 which is defined as the sequence of feature vectors as shown in the input layer of the network in FIGS. 1 and 2 and in FIG. 9. Feature vector elements have values represented as $a_1, a_2 \ldots, a_n$. In the example shown in FIG. 3, n is set to 8. An input bias is supplied to the $n+1$ input of a neuron which has been omitted from the figure for the sake of ease in understanding. For simplicity, the bias is generally set to a constant value such as 1. The input values and the bias are supplied to multipliers 202-1 through 202-$(n+1)$; the extra multipler 202-$(n+1)$ is used for the bias input. The multipliers also accept input from a kernel having weights $w_1$ through $w_{n+1}$. Outputs from all multipliers are supplied to adder 203 which generates the weighted sum of the input feature vector element values. As such, the output from adder 203 is simply the dot product of a vector of input feature vector element values (including a bias value) with a vector representing the kernel of weights. The output value from adder 203 is passed through the nonlinear function in nonlinearity 204 to generate a single unit output value $x_{i,j}$. As will be understood more clearly below, unit output value $x_{i,j}$ is related to the value of the $i^{th}$ feature vector and the $j^{th}$ element of the vector in the layer 300 under consideration.

In an example from experimental practice, an exemplary sigmoid function for nonlinearity 204 is chosen as a scaled hyperbolic tangent function, $f(\alpha) = A \tanh S\alpha$ where $\alpha$ is the weighted sum input to the nonlinearity, A is the amplitude of the function, and S determines the slope of the function at the origin. As shown above, the nonlinearity is an odd function with horizontal asymptotes at $+A$ and $-A$. It is understood that nonlinear functions exhibiting an odd symmetry are believed to yield faster conversions of the kernel weights $w_1$ through $w_{n+1}$. In an example from experimental practice, the amplitude A was set to 1.716 while the slope S was set to $\frac{2}{3}$.

Weights for each of the kernels in the time delay neural network were obtained by supervised training using a trial and error learning technique known as back propagation. See the Rumelhart et al. reference cited above or see R. P. Lippmann, "An Introduction to Computing with Neural Nets", *IEEE ASSP Magazine*, Vol. 4, No. 2, pp. 4-22 (1987). Prior to training, each of weight in the kernel is initialized to a random value using a uniform distribution between, for example, $-2.4/F_i$ and $2.4/F_i$ where $F_i$ is the number of inputs (fan-in) of the unit to which the connection belongs. For the example shown in FIG. 3, the fan-in $F_i$ is equal to $n+1$.

The weights are adjusted during a supervised training session which performs gradient descent in weightspace with a cost function. An exemplary output cost function is the well known means squared error function:

$$MSE = \frac{1}{OP} \sum_p \sum_o \frac{1}{2} (d_{op} - x_{op})^2$$

where P is the number of patterns, O is the number of output units, $d_{op}$ is the desired state for output unit o when pattern p is presented, and $x_{op}$ is the state for output unit o when pattern p is presented. Target values are binary: $d_{op}$ is $+1$ when o is in class (p) and is $-1$ otherwise. By using this initialization technique, it is possible to maintain values within the operating range of the sigmoid nonlinearity. During training, frame sequences for a plurality of characters are presented in a constant order. Weights are updated according to the stochastic gradient or "on-line" procedure after each presentation of a single image pattern for recognition. A true gradient procedure may be employed for updating so that averaging takes place over the entire training set before weights are updated. It is understood that the stochastic gradient is found to cause weights to converge faster than the true gradient especially for large, redundant image data bases.

The training procedure preserves the convolutional constraint, described in more detail below, on the connection pattern when it modifies the weights. This is implemented by weight sharing.

Standard techniques are employed to convert a handwritten character to the initial input feature vector sequence prior to preprocessing. In general, the sequence is obtained by capturing a writing on a electronic tablet as described in more detail below. Regardless of its source and in accordance with conventional practice, the character image is represented as a sequence of frames or feature vectors related as an ordered collection of feature vector elements. The ordered collection is typically based on a temporal variable. Once represented, the character image is generally captured and stored in an optical memory device or an electronic memory device such as a frame buffer. See FIG. 4 and its related description.

Each element in a feature vector has a value associated with it. These will be described in more detail below. The values of feature vector elements are then stored in the memory devices. When reference is made to a particular feature vector or frame sequence, it is understood that the term feature vector element includes unit values and feature vector elements output from each neuron combining to form a new feature vector sequence in a hidden layer or output layer.

Realization of the neurons and, for that matter, the entire network may be in hardware or software or some convenient combination of hardware and software. Much of the network presented herein has been implemented using a AT&T 6386 workstation with simple programs performing the rudimentary mathematical operations of addition, subtraction, multiplication, and comparison. Pipelined devices, microprocessors, and special purpose digital signal processors also provide convenient architectures for realizing the network in accordance with the principles of the invention. MOS VLSI technology may be employed to implement particular weighted interconnection networks of the type shown in FIG. 2. Local memory is desirable to feature element values and other temporary computation results.

The network exhibits a local, convolutional layered structure having input layer 100, first hidden layer 101, second hidden layer 102, third hidden layer 103 and output classification layer 104. It is a feed-forward layered network. In the exemplary case shown in FIGS. 1 and 2, we have four layers of weights connecting five layers of units (since we count the input as a degenerate "layer$\neq$0"). The weights are associated with the four sets of neurons 109 interconnecting the five layers. Layers other than the input layer (frame sequence) and the output classification layer are called "hidden" layers.

Connections in the network are designed to be local. A particular unit or neuron has a receptive field that is limited in the time direction. That is, all its inputs come from a group of consecutive frames in the previous layer. The receptive field of unit i will have considerable overlap with the receptive field of unit $i-1$, if the receptive fields extend far enough along the time axis. This induces a topology on the input space, giving the network a hint that it should be looking for sequences.

The network is convolutiuonal. That is, the weights connecting one frame (in layer $m+1$) to its receptive field (in layer m) are the same as the weights connecting the next frame n the same sequence to the next receptive field. The motivation for this is that we expect that a particular meaningful feature (e.g. a line or a curve) can occur at different times in the sequence. It also means that there are far fewer parameters, which facilitates training and improves generalization.

The final specialization of our network is that each layer has a coarser time representation than the preceding layer. This is implemented by subsampling: only one every s values in the convolution is kept (and actually computed). Subsampling causes adjacent neurons in one layer to have receptive fields spaced apart by at least 2 frames in the prior layer. That is, if neuron 1 in the first hidden layer 101 has its receptive field beginning with frame 1 in the input layer 100, then neuron 2 in the first hidden layer would have its receptive field beginning at least with frame 2 in the input layer.

A network of this type is called a time-delay neural network since each neuron's decision at time n is based on frames $f(n-1), f(n-2), \ldots, f(n-m)$, where m is the length of the weight kernel. The convolutional structure of the network can be thought of in two complementary ways: as a single neuron scanned over its input sequence (re-use in time and sequential processing), or as a group of neurons with weights constrained to be equal (replication in space; parallel processing). In either case we will refer to the neuron(s) controlled by a single kernel as a regiment. Note that the regiment's complete operation does not meet the strict definition of a convolution, because of the nonlinear squashing function, and because of the subsampling. Certainly it is a convolution in spirit.

Interpretation of the kernels that are obtained by training is in general a very tedious task. Most kernels cannot readily be interpreted as extracting simple or obvious features, but rather complicated combinations.

As outlined in FIG. 1 and FIG. 2, the frame representation in first hidden layer 101 is obtained by applying several regiments to the input frame-sequence (one regiment per feature-vector component in that hidden layer) in input layer 100. In turn, second hidden layer 102 applies several regiments to the frames just created by first hidden layer 101. By repeating this operation (convolution with squashing and subsampling), we extract progressively more complex features, sensitive to progressively wider portions of the input field. Finally comes output classification layer 104, which is fully connected to the third hidden layer 103. In this respect, the outputs of the network can be considered as the ultimate most global features.

It is contemplated that the network have at least two hidden layers for satisfactory performance. In addition, the number of features per frame and the number of frames per layer are matters of design choice. But, it is contemplated that the number of frames in one layer is always at most one-half the number of frames in the previous layer as a result of subsampling. As shown in FIG. 1, input layer 100 comprises 81 frames having seven features per frame. By subsampling with a factor of 3, first hidden layer 101 comprises 27 frames having ten features per frame. In the transition to second hidden layer 102, subsampling by a factor of 3 causes layer 102 to have five frames of 16 features per frame. Third hidden layer 103 comprises three frames of 24 features each as a result of subsampling by a factor of 3. Finally, output classification layer 104 comprises one frame divided into ten digit features (0-9) and 26 letter features (A-Z).

For the example shown in FIG. 1, neurons in first hidden layer 101 have a receptive field covering all seven features in nine consecutive frames of input layer 100. Second hidden layer 102 has neurons which use a receptive field covering all ten features of seven consecutive frames in layer 101. Neurons in third hidden layer 103 have a receptive field covering all 16 features in five consecutive frames of layer 102. Finally, neurons in output classification layer 104 have a receptive field covering all 24 features in all three frames of layer 103. As stated above, the size of the receptive field and therefore the size of the kernel is a matter of design choice. In the example above, the kernel size has been chosen so that the number of inputs per neuron is substantially constant. For this example, the kernel overlaps an ever increasing fraction of the frames in a given layer. It has been determined from experimental practice that variations in the kernel length resulted in insignificant performance degradation of the network.

The loss of time resolution in the feature vectors due to subsampling is partially compensated by an increase in the number of features. This is called "bi-pyramidal" scaling because, as the layer size decreases along the time dimension, it increases along the feature dimension. The number of units, and therefore the information-carrying capacity, in each layer is reduced less than the subsampling along might suggest.

The specification of an exemplary time delay neural network from experimental practic is summarized in FIG. 2. The network has 35,964 connections, but only 6348 independent weights. To remove border effects at the first and last frame of the original written character, cyclic boundary conditions have been chosen to allow some replicas of the time-delay neurons to overlap the end and the beginning of a sequence of frames. Cyclic boundary conditions or cyclic closures are described below in relation to the preprocessor.

PREPROCESSOR

Handwritten characters are entered on an electronic tablet such as a mouse, a joystick, a touch terminal or the like. The terminal records trajectory information for each character. The trajectory information comprises drawing actions which are recorded as a sequence of coordinates, for example, Cartesian coordinates [$x(t)$, $y(t)$]. Such sequences are then transformed to obtain invariance with respect to position, scale, and writing speed for a single character. Additional preprocessing of the handwritten characters permits extraction of local geometric information such as direction of movement and curvature of trajectory. This type of preprocessing preserves the temporal or sequential nature of handwritten character information for use in a subsequent character recognition process. As stated earlier, this is in contrast to prior approaches where preprocessing is performed on a pixel map representation of the handwritten character which lacks temporal information about the plurality of image points.

Preprocessing is performed by employing a touch terminal for data gathering and a processor for interfacing with the touch terminal and for performing the preprocessing functions on the gathered data. This combination is shown in simplified block diagram form in FIG. 4.

The touch terminal includes transparent, touch-sensitive screen 11 overlaid on a standard liquid crystal display 12. Resolution of the touch-sensitive screen is greater than the resolution of the liquid crystal display. In an example from experimental practice, the touch-sensitive screen is a resistive matrix with a resolution of 4096×4096 while the liquid crystal display has a resolution of 640×480. Touch terminals of this type are readily available in commercially packaged units such as GRiDPAD from GRiD Systems Corporation and Toshiba PenPC from Toshiba America Information Systems, Inc. The latter exemplary touch terminal is packaged with a standard microprocessor chip to permit execution of software application programs with the liquid crystal display and touch sensitive screen as the output and input devices, respectively.

Writing on the touch-sensitive screen is accomplished with any type of writing instrument 19 or stylus including one's finger. In the description which follows, the writing instrument is illustratively called a "pen". The character size in this example is limited by permitting pen strokes to occur within a predetermined box, for example, a 72×72 pixel box. Other size and shape boxes may be employed.

The touch terminal is connected via leads 15 to a processing device 18 which includes well known control electronics for handling information from the touch-sensitive screen, such as screen driver/controller 13, and for supplying information to the liquid crystal display, such as display driver/controller 14. As stated above, the Toshiba PenPC is an example of a touch terminal in combination with a processor and the necessary interface and control electronics for handling information between the processor and the touch terminal. Alternatively, the touch terminal may be connected to a personal computer supplemented with the preprocessing capabilities described below. Information from the touch-sensitive screen is supplied from the touch screen control electronics in the processor to computation elements, 16 and 17 within the processor to perform all the steps of preprocessing the handwritten character.

Character trajectory information from the touch-sensitive screen is sampled to produce the sequence of coordinates when the pen is touching the screen. Sampling the trajectory, as shown in step 21 of the process in FIG. 5, produces a sequence of points or coordinates which are spaced apart equally with respect to time. In one embodiment, sampling occurred once every 12 ms. Since a handwritten character may be drawn by lifting the pen from one location to another and then placing the pen down to continue drawing the character, for example, the printed capital letter "A", it has been assumed that the pen is no longer in contact with the touch-sensitive screen when the sequence of coordinates is interrupted for a period longer than 60 ms. Pen up and pen down information is collected and used in the later preprocessing functions performed by the processor.

Figure 5:
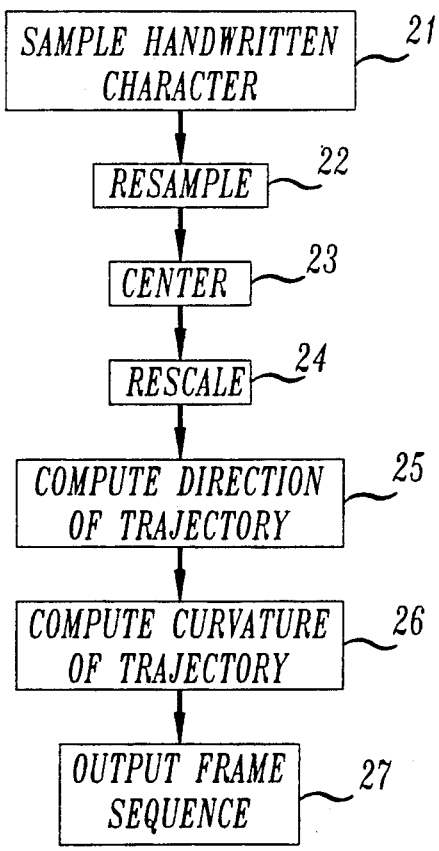
FIG. 5 depicts a flow diagram of the functions performed by a preprocessor.

An important purpose of preprocessing is to create an intermediate representation of the handwritten character wherein the intermediate representation may be a sequence of frames or feature vectors related to points along the trajectory of the character. It is desirable to preprocess the characters in a way which reduces variability of those aspects which inhibit discrimination between classes of characters. Such a reduction of variability is understood to increase the invariance of the input characters. It is also desirable to enhance the variability of those aspects of the handwritten characters which improve discrimination between character classes. The first steps of preprocessing after initial sampling of the character as shown in FIG. 5, namely, resampling, centering, and rescaling, greatly reduce meaningless variability in the handwritten character by removing time distortions and scale distortions. The final steps of preprocessing enhance the variability by capturing useful geometric information about local slope and local curvature of the handwritten characters.

Resampling as shown in step 22 of the process is the first step of preprocessing. It is used to obtain a constant number of points, regular spacing of points, or a constant number of regularly spaced points on the original trajectory of the handwritten character. By resampling the original data collected from the handwritten character, it is possible to remove the variations which occur as a result of writing speed. Irregularities in pen speed result in considerable local translation mismatches which occur when two sequences contain similar frames (character information), but the corresponding frames in the sequences occur at different places. The term "frames" is defined below in this description. Arc length between two features is highly constrained because this determines the appearance of the written character. In contrast, there are very loose constraints on the occurrence of features, that is, when they are expected to be created by the pen. For this reason, resampling is a central feature of the preprocessor because it aids in reducing large translation mismatches.

Figure 6:
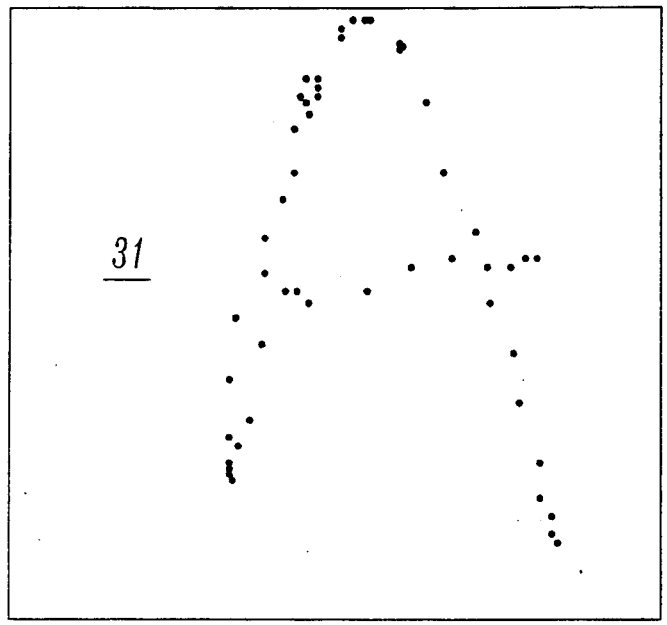
FIG. 6 shows a comparison of handwritten character data before resampling and after resampling, centering, and rescaling.
Figure 6:
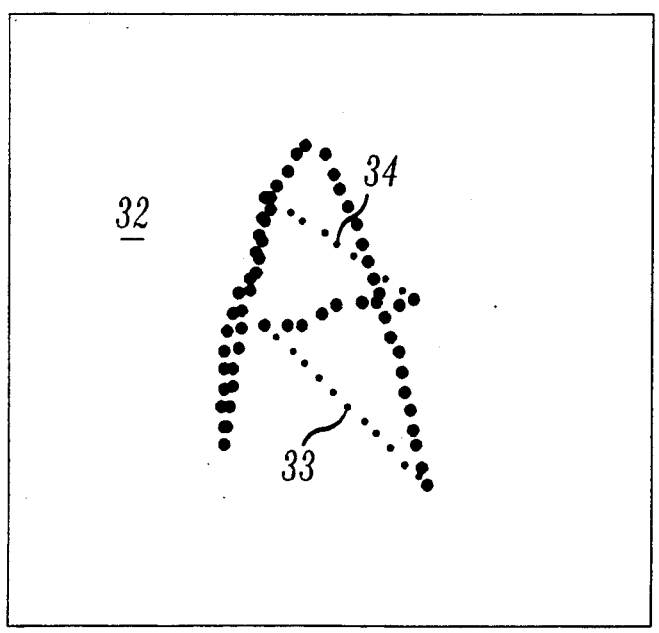

Various standard interpolation techniques taught in well known numerical analysis texts may be employed for resampling. One technique employed in experimental practice in the present invention has been simple linear interpolation. The choice of interpolation technique is dependent on the subsequent results obtained in the classifier or recognizer. An example of a handwritten character before and after resampling is shown in FIG. 6. Input sequence 31 to the resampling element of the preprocessor is represented by coordinates which are regularly spaced in time, that is, [x(t), y(t)] where the time difference between adjacent samples is substantially constant for the sequence representing a character. Output sequence 32 from the resampling element, including the later described functions of rescaling and centering, is represented as a sequence of points, [x(n), y(n)] which are regularly spaced in arc length. Output sequence 32 also includes points not displayed in the original character sequence, namely, pen-up stroke 33 and cyclic closure 34. Pen-up strokes are hidden segments related to interpreted trajectories where the pen changes from a down state to an up state and back to a down state such as when forming the cross bar on top on the vertical line in a capital "T". Cyclic closures are interpreted trajectories which are formed between the endpoint of the character and the origin of the character.

As mentioned above, the resampling element is also responsible for encoding the up and down states of the pen and utilizing the information to create "pen-up" strokes such as stroke 33 in the sequence of points as shown in FIG. 6. The pen-up stroke is also important for avoiding large translation mismatches for quite similar characters. Such similarities exist when the pen is lifted or not lifted along a particular segment, for example, when a line is retraced. These similarities also arise when characters differ only by viewing the direction or length of the pen-up stroke such as between the capital letters "I" and "F" where each character is made up of three separate strokes.

The pen states, up and down, may be encoded as $+1$ and $-1$, respectively. As shown in FIG. 6, the large dots in the figure correspond to points at which the pen has been in a down position whereas the small dots correspond to points at which the pen has been in an up position. The encoded value of the pen state is output in the frame with the coordinate information as an additional feature variable called penup(n). A pen-up stroke is inserted in the character sequence of frames as a straight line segment between two locations, namely, one location where the pen was last down (i.e., before the pen was picked up) and another location where the pen was next down (i.e., after the pen was no longer up). In this case, the pen is assumed to move directly from one location where it was last down to another location where it is next down. Pen-up strokes differ from a corresponding pen-down or written segment in that the penup(n) variable of the former indicates the up state of the pen. It should be noted that the character segments related to those portions of the character where the pen is up are also resampled.

Discontinuities at boundaries of the character such as the beginning and ending points of the character are removed by inserting a sequence of frames into the character sequence which connects the last pen down point to the first pen-down point in the handwritten character. This feature called cyclic closure makes it easier to extract information from the sequence in subsequent recognition and classification operations. For example, it aids in distinguishing a "0" from a "6". For the cyclic closure, the pen is artificially forced to return to its starting position from the last point at which the pen was down. This is done by adding a segment of points for which the feature variable penup(n) is encoded in the up state and the segment of points is made to extend from the point at which the pen was last down in the character to the point from which the handwritten character started. Cyclic closures are also subject to resampling to introduce uniform point spacing over the trajectory.

From experimental practice, it has been found that the number of points recorded with the pen in the down state for the original handwritten character varies between a minimum of 5 and a maximum of 200. The average number of points is approximately 50 per character. Resampling generally produces characters having a total of approximately 81 points including points for pen-up strokes and cyclic closures. It will be clear to those skilled in the art that the number of points in the original character can be varied as a function of the original sampling rate. Moreover, the number of points in the resampled character can also be varied to achieve greater or lesser smoothness in the interpolative fit.

Figure 8:
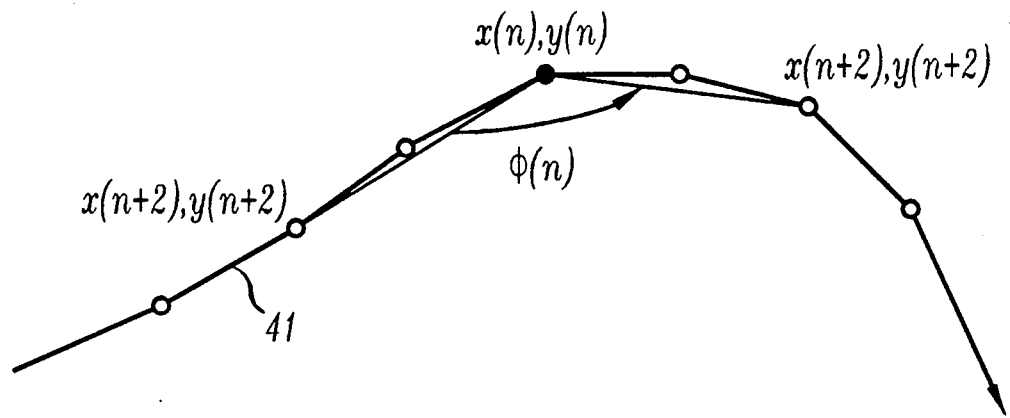
FIG. 8 shows the geometric parameters of the handwritten character used to estimate curvature.

As shown in FIG. 8, the preprocessor subjects the resampled handwritten character to centering and rescaling shown as steps 23 and 24, respectively, of the process in FIG. 8. This is done to make the intermediate representation of the handwritten character output by the preprocessor invariant to translations and scale distortions. In other words, centering and rescaling reduce variability within classes. Centering causes the resampled character to be translated to a central position within a predetermined work area or area of interest. Rescaling causes the resampled character to be adjusted to a predetermined (normalized) size. In particular, rescaling shrinks or enlarges the character size, as necessary, in order that all characters end up as substantially the same size.

In order to perform centering and rescaling, it is necessary to set the origin at the center of the resampled character as follows:

$$x_0 = \frac{x_{max} + x_{min}}{2}$$

$$y_0 = \frac{y_{max} + y_{min}}{2},$$

where the subscripts maximum and minimum refer to the extrema along the specified x or y direction.

Rescaling is performed by utilizing a factor $\delta_y$ as follows:

$$\delta_y = \frac{y_{max} - y_{min}}{2}.$$

New coordinates output from the centering and rescaling portion of the preprocessor are as follows:

$$\frac{x(n) - x_0}{\delta_y}$$

$$\frac{y(n) - y_0}{\delta_y}.$$

In this way, the new y coordinates vary between $+1$ and $-1$ and the new x coordinate usually stays within the same range because most characters are taller than they are wide.

The rescaling with respect to $\delta_y$ has been chosen rather than the rescaling with respect to $\delta_x$ for both coordinates or $\delta_x$ for the x coordinate and $\delta_y$ for the y coordinate because rescaling with respect to $\delta_x$ would tend to introduce severe distortions for narrow characters such as the numeral "1". In the discussion immediately above, $\delta_x$ is defined as follows:

$$\delta_x = \frac{x_{max} - x_{min}}{2}.$$

Figure 7:
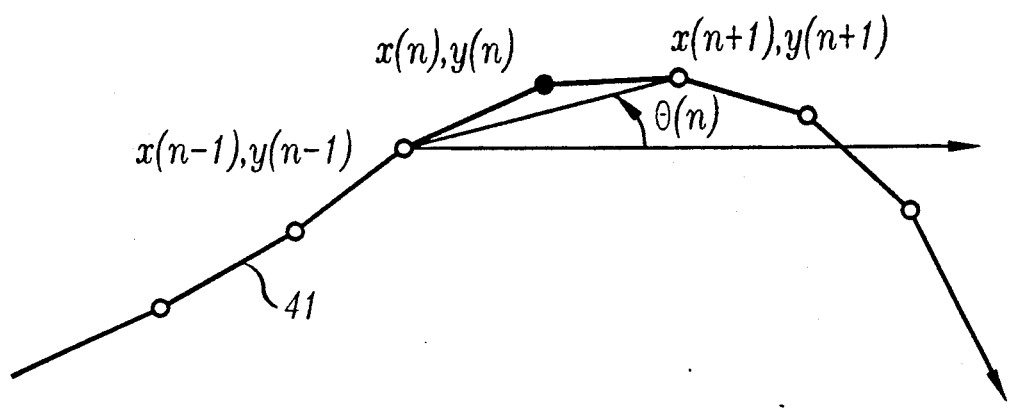
FIG. 7 shows the geometric parameters of the handwritten character used to estimate the direction of trajectory.

Subsequent classification and recognition of the handwritten characters by a neural or computation network are facilitated by extracting information about the direction of trajectory and the curvature of trajectory at a particular instant of time. The direction of trajectory is also referred to as the slope. Variables used in estimating the direction of trajectory and curvature of trajectory are shown in FIGS. 7 and 8 with respect to segment 41 of a resampled handwritten character.

Direction of a stroke is estimated using direction cosines of the tangent to the curve (segment 41) at point n. The direction cosines as estimated are analogous to the discrete approximations of first derivatives with respect to arc length, namely, dx/ds and dy/ds, where $ds = \sqrt{dx^2 + dy^2}$. The direction cosines of the tangent to the curve at point n are given as follows:

$$\cos\theta(n) = \frac{\Delta x(n)}{\Delta s(n)}$$

$$\sin\theta(n) = \frac{\Delta y(n)}{\Delta s(n)}$$

where $$\Delta x(n) = x(n + 1) - x(n - 1)$$
$$\Delta y(n) = y(n + 1) - y(n - 1)$$

$$\Delta s(n) = \sqrt{\Delta x(n)^2 + \Delta y(n)^2}.$$

As a result of regular resampling, $\Delta s(n)$ is constant and equal to the total length of the character trajectory divided by the total number of points resulting from resampling. The direction cosine representation has been chosen for the direction or slope of the trajectory because it does not require computation of transcendental functions, it involves well bounded parameters, and it affords smooth changes for the parameters without branch cuts. Of course, the direction of the trajectory can be represented as a single parameter such as $\theta(n)$ or $\tan\theta(n)$. However, such a single parameter encoding of the angle would not have the attributes of continuity, periodicity, and boundedness.

Another element of local angle information is curvature. This information is readily available from the trajectory of the resampled handwritten character. In general, curvature is determined from the second derivatives of x and y with respect to arc length. These derivatives are not bounded. Therefore, local curvature information is extracted by measuring the angle between two elementary segments of the trajectory as shown in FIG. 8 and described as follows:

$$\theta(n) = \theta(n+1) - \theta(n)$$

This angle is encoded into the intermediate representation by its cosine and sine which are computed with the following formulae:

$$\cos\theta(n) = \cos\theta(n-1)\cdot\cos\theta(n+1) + \sin\theta(n-1)\cdot\sin\theta(n+1)$$

$$\sin\theta(n) = \cos\theta(n-1)\cdot\sin\theta(n+1) - \sin\theta(n-1)\cdot\cos\theta(n+1).$$

The intermediate representation of the handwritten character comprises a sequence of frames parameterized by the frame number n. Each frame is a feature vector which includes all the information extracted for each point in the character. In accordance with the principles of the present invention, the feature vector or frame includes any or all of the following seven components:

$$f_0(n) = penup(n)$$

-continued $$f_1(n) = \frac{x(n) - x_0}{\delta_y}$$

$$f_2(n) = \frac{y(n) - y_0}{\delta_y}$$

$f_3(n) = \cos\theta(n)$
$f_4(n) = \sin\theta(n)$
$f_5(n) = \cos\phi(n)$
$f_6(n) = \sin\phi(n)$ In general, all these components are bounded and vary between $-1$ and $+1$, with exception of $f_1(n)$ which may occasionally go slightly outside these bounds. It is contemplated that some of the features in each frame may be omitted but it is understood that this will most likely affect performance of a classification or recognition arrangement into which the sequence of frames is input. From experimental practice, it was discovered that, by adding features $f_0(n)$, $f_1(n)$, and $f_2(n)$ to a frame already including features $f_3(n)$ and $f_4(n)$, error rate performance was halved for a particular neural network recognizer using the frame sequence as input. Another halving of the error rate performance for the same network was achieved by adding features $f_5(n)$ and $f_6(n)$ to the frame.

An example of the intermediate representation of an exemplary character is shown in FIG. 9. Intermediate representation 65 is for the character "C" shown within box 60. Several segments of interest for the character are shown in box 61 labelled A and box 62 labelled B. The latter two boxes relate to character segments which correspond directly to the similarly labelled boxes around portions of intermediate representation 65. That is, the frames in box 63 labelled A correspond to the points in the character segment within box 61 labelled A. Similarly, the frames in box 64 labelled B correspond to the points in the character segment within box 62 labelled B.

Intermediate representation 65 shows a sequence of 81 feature vector frames wherein each frame comprises a seven element feature vector as described above. Time which is parameterized by resampling as the frame number n is understood to increase along a horizontal axis from left to right for representation 65. The size and color of the boxes for each feature vector element indicate the sign and magnitude of the component. The conventions used in FIG. 9 are that (1) black indicates a negative sign whereas white indicates a positive sign and (2) the magnitude is directly proportional to the size of the box.

As shown in FIG. 9, the segment in box 61 is in the middle of a gentle curve and the corresponding intermediate representation in box 63 shows a gradually changing direction via feature vector components $f_3(n)$ and $f_4(n)$ and a fluctuating curvature via feature vector components $f_5(n)$ and $f_6(n)$. This representation is compared to the one in box 62 which is in the middle of a straight line corresponding to a constant direction with zero curvature. Both of these local geometric features can be seen from an inspection of the feature vector components $f_3(n)$ through $f_6(n)$ in box 64.

It is contemplated that the preprocessor accept any pen trajectory information for any symbol no matter where or how the symbol originated provided that the pen trajectory information is in the form of a sequence of temporally acquired coordinates. It is contemplated that the written character or symbol be created by a human or machine.

The present frame structure, that is, the intermediate representation, is particularly well suited for use as input data for a time delay neural network. Moreover, the extraction of geometric information together with the normalization, resampling, centering, and rescaling of the character data sequence and the insertion of pen-up strokes and cyclic closure strokes are believed to combine advantageously in improving subsequent classification and recognition by a computation network.

We claim:

1. Apparatus for outputting one of a plurality of predetermined symbols in response to an input written character wherein the character is represented as a temporally related sequence of frames, each frame having a plurality of feature elements, the apparatus comprising, means responsive to the sequence of frames for generating a second sequence of frames having a length N and including frames of phantom information selected from the group consisting of pen-up strokes and cyclic closure strokes;

time-delay neural network means including hidden layer means for subsampling and detecting constrained features from the second sequence of frames to create a complex frame sequence having a length M, where M is at most substantially equal to N/2, and output layer means fully connected to the hidden layer means for identifying the one of the plurality of predetermined symbols which matches most closely the input written character.

2. The apparatus as defined in claim 1 wherein the hidden layer means comprises, first hidden sublayer means for subsampling and detecting constrained features from the second sequence of frames to generate a third frame sequence having length K, where K is at most substantially equal to N/2;

second hidden sublayer means for subsampling and detecting constrained features from the third frame sequence to generate a fourth frame sequence having length J, where J is at most substantially equal to K/2; and third hidden sublayer means for subsampling and detecting constrained features from the fourth frame sequence to generate the complex frame sequence.

3. The apparatus as defined in claim 1 wherein the complex frame sequence includes R features per frame and wherein the second sequence of frames includes S features per frame, R being greater than or equal to S.

4. A time delay neural network for outputting one of a plurality of predetermined symbols in response to an input written character wherein the character is represented as a temporally related sequence of frames, each frame having a plurality of feature elements, the network comprising hidden layer means for subsampling and detecting constrained features from the temporally related sequence of frames to create a complex frame sequence having a length M, where M is at most substantially equal to N/2, and output layer means responsive to the complex frame sequence and being fully connected to the hidden layer means for identifying the one of the plurality of predetermined symbols which matches most closely the input written character.

5. The apparatus as defined in claim 4 wherein the hidden layer means comprises, first hidden sublayer means for subsampling and detecting constrained features from the temporally related sequence of frames to generate a second frame sequence having length K, where K is at most substantially equal to N/2;

second hidden sublayer means for subsampling and detecting constrained features from the second frame sequence to generate a third frame sequence having length J, where J is at most substantially equal to K/2; and third hidden sublayer means for subsampling and detecting constrained features from the third frame sequence to generate the complex frame sequence.

6. The apparatus as defined in claim 4 wherein the complex frame sequence includes R features per frame and wherein the second sequence of frames includes S features per frame, R being greater than or equal to S.

7. The apparatus as defined in claim 5 wherein the complex frame sequence includes R features per frame and wherein the second sequence of frames includes S features per frame, R being greater than or equal to S.

* * * * *